(12) United States Patent
Hoeptner, III

(10) Patent No.: US 7,409,964 B2
(45) Date of Patent: Aug. 12, 2008

(54) FAUCET TYPE VALVE WITH BACKFLOW CONTROL IN HANDLE STRUCTURE

(76) Inventor: Herbert W. Hoeptner, III, 7796 Oak Springs Cir., Gilroy, CA (US) 95020

( * ) Notice: Subject to any disclaimer, the term of this patent is extended or adjusted under 35 U.S.C. 154(b) by 0 days.

(21) Appl. No.: 11/293,375

(22) Filed: Dec. 5, 2005

(65) Prior Publication Data
US 2007/0278440 A1    Dec. 6, 2007

(51) Int. Cl.
*F16K 24/00*    (2006.01)
(52) U.S. Cl. .................. 137/218; 251/334; 251/210
(58) Field of Classification Search .............. 251/210, 251/333, 334; 137/217, 218
See application file for complete search history.

(56) References Cited

U.S. PATENT DOCUMENTS

| | | | | | |
|---|---|---|---|---|---|
| 1,847,385 | A | * | 3/1932 | Dengler | 251/86 |
| 3,054,422 | A | * | 9/1962 | Napolitano | 137/509 |
| 3,929,150 | A | * | 12/1975 | Flinner et al. | 137/218 |
| 4,209,033 | A | * | 6/1980 | Hirsch et al. | 137/218 |
| 4,254,792 | A | * | 3/1981 | Schadel | 137/240 |
| 5,752,542 | A | * | 5/1998 | Hoeptner, III | 137/218 |
| 6,769,446 | B1 | * | 8/2004 | Ball et al. | 137/59 |

* cited by examiner

*Primary Examiner*—John K. Fristoe, Jr.
(74) *Attorney, Agent, or Firm*—William W. Haefliger

(57) ABSTRACT

In a valve, the combination comprising a valve chamber, having a flow inlet and a flow outlet, a valve operator outside the chamber, a stopper in the chamber and operatively connected with the operator for movement toward and away from seat structure in the chamber, to control flow from the valve via the outlet, and the seat structure including first and second seats, the stopper located to seat on the first seat. there being a flexible sealing lip carried by the stopper to sealingly engage the second seat when the stopper sets on the first seat. Relatively movable parts define said operative connection, with configuration and relative movement to allow air inflow to break back siphonage of liquid, and to allow back pressure relief via drain passages.

9 Claims, 7 Drawing Sheets

FAUCET TYPE VALVE WITH BACKFLOW CONTROL IN HANDLE STRUCTURE

BACKGROUND OF THE INVENTION

This invention relates generally to valves such as faucet valves, and more particularly to improvements in sealing off of flow through a faucet when foreign material or particles reside at sealing surfaces.

There is need for improvements in faucet valves, which will ensure sealing when foreign particles are carried in or by the fluid flow through the valves. In particular, there is need for such reliable sealing improvements when foreign particles become inadvertently wedged or seated between stopper and seat surfaces.

SUMMARY OF THE INVENTION

It is a major object of the invention to provide a solution to the problems referred to, and to meet the need for the stated improvements in a faucet type valve. Basically, the improved faucet valve provided includes:

a) a valve chamber, having a flow inlet and a flow outlet, b) a valve operator outside the chamber, c) a stopper in the chamber and operatively connected with the operator, as for example a handle, for movement toward and away from seat structure in the chamber, to control flow from the valve via said outlet, d) and the seat structure including first and second seats, the stopper located to seat on the first seat.

e) there being a flexible sealing lip carried by the stopper to sealingly engage the second seat when the stopper seats on the first seat.

It is another object of the invention to provide an annular sealing lip which extends about a stopper annular surface that engages the first seat. As will be seen, the lip typically tapers toward an annular edge that flexes when engaging the second seat. Further, the lip is typically configured with taper to seal off against said second seat and also to asymmetrically flex and seal off against or about a foreign element on the second seat.

A further object is to provide telescopically interfitting parts, which are relatively movable, one part connected to the handle, and the other part carrying the stopper and such parts typically being tubular. Typically, the one part has threaded connection to the chamber, for advancing that one part toward the seat, in response to handle rotation. Said one part may define a drain port to drain fluid from the interior of said one tubular part in which the other part projects.

Yet another object includes provision of a compression spring within the interior of said one part, the spring acting to urge said other part toward the seat. The spring may be configured and located to cushion engagement of the stopper by said one part, and via the other part, as the handle is rotated.

A further object is to provide passages in the relatively movable parts to supply exterior air to flow past the stopper via said lip, in closed position of the stopper, with the lip engaging a fouling element.

These and other objects and advantages of the invention, as well as the details of an illustrative embodiment, will be more fully understood from the following specification and drawings, in which:

DRAWING DESCRIPTION

DETAILED DESCRIPTION

Figure 5:
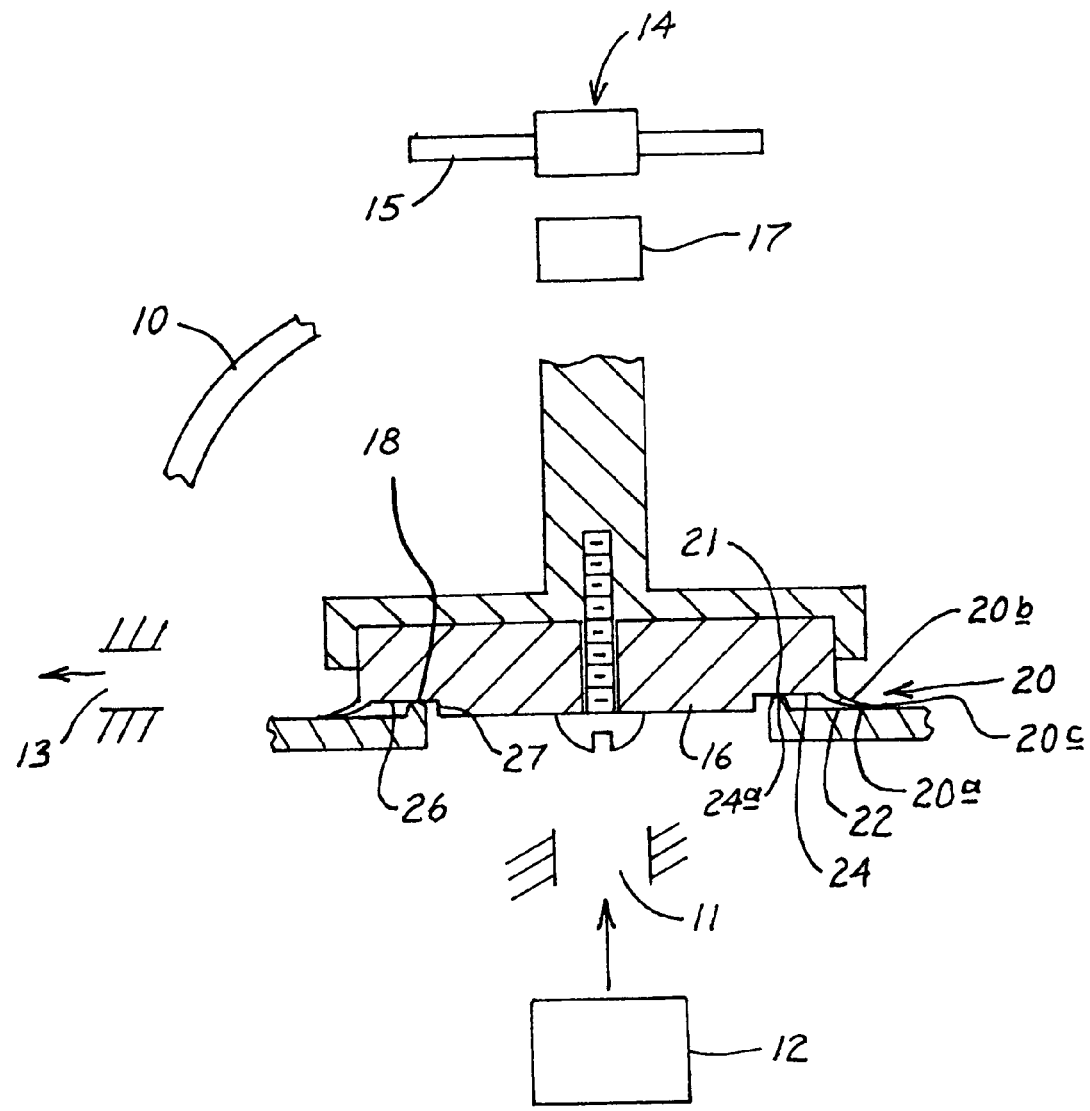
FIG. 5 is a view of the valve stopper and seats in detail, during closed condition.

Referring first to FIG. 5, the structure shown in combination includes:

a) a valve chamber 10 having a flow inlet 11 from a liquid supply 12, and a flow outlet 13;

b) a valve operator 14, such as a rotary handle 15, outside the chamber;

c) a stopper 16 in the chamber and operatively connected, at 17, with the operator 14, for movement toward and away from seat structure 18 in the chamber, to control flow from the valve via the outlet;

d) the seat structure including first and second seats, 21 and 22, the stopper located to seat on or against the first seat 21 in closed position as shown;

e) the stopper carrying a flexible lip 20 to sealingly engage the second seat when the stopper forcibly seats on the first seat.

As shown, the lip 20 is annular, and extends about a stopper annular surface 24 that engages the annular first seat 21 at 24a. Seat 21 may project above the level of seat 22, and into a pocket or recess 26 formed by surface 24, lip 20 and an annular shoulder 27 defined by the stopper 16. Pocket 26 radially spaces lip sealing at 20a from load or forcible seating at 24a, to make sure that the lip 20 does not engage the projecting seat 24a, which would interfere with lip function.

Figure 6:
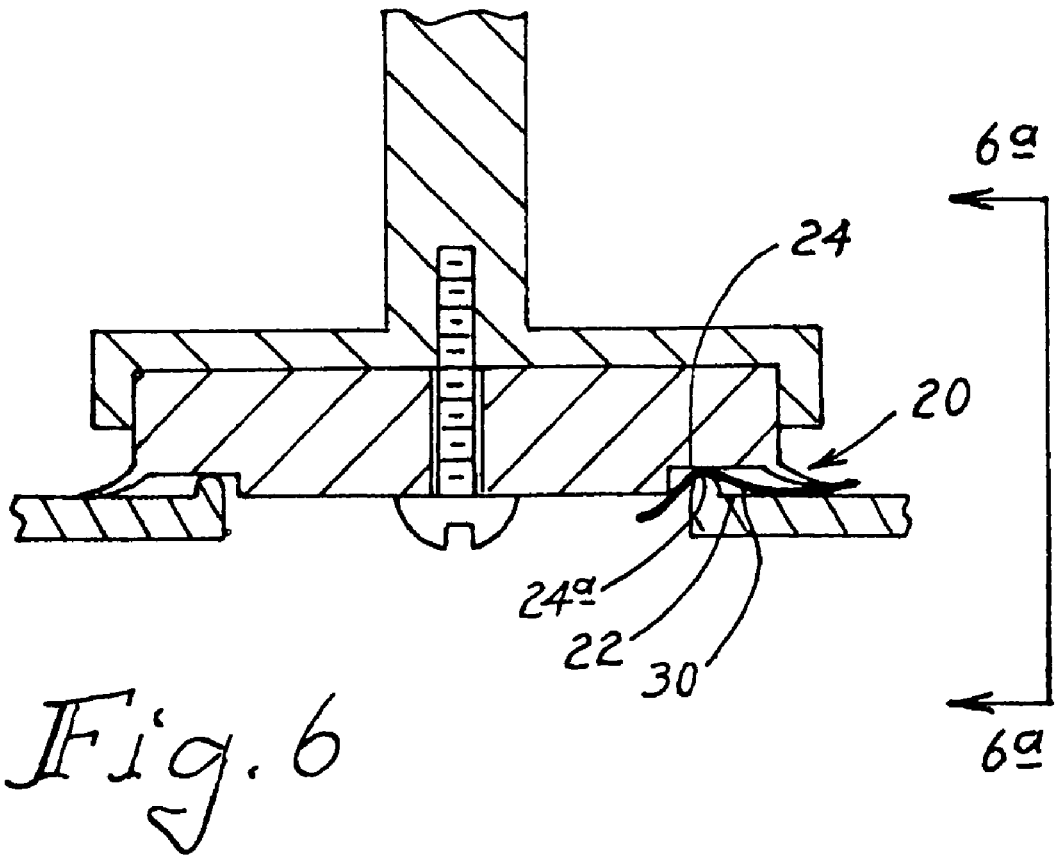
FIG. 6 is a view like FIG. 5, showing lip sealing during particle fouling.
Figure 6A:
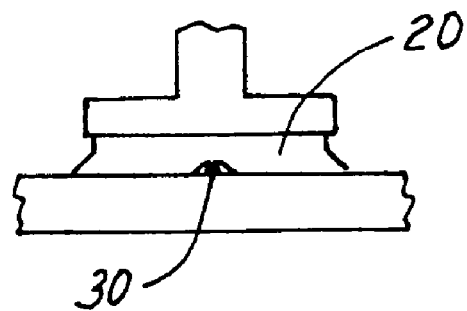
FIG. 6a is an elevation on lines 6a-6a of FIG. 6.

Also, the lip tapers radially outwardly, and axially, at 20b, toward an annular edge 20c that flexes when engaging the second seat, and to controlled extent determined by axial positioning of seating at 24a. The lip is configured with axial and radial tapered elongation or dimensioning not only to seal off against the second seat 22, but also to asymmetrically and locally flex and seal off against a foreign particle or particles 30 that may lodge at a locus between 22 and 24, as seen in FIGS. 6 and 6a disturbing sealing at locus 24a. In that event, the lip assures sealing as seen in FIG. 6a with lip flexing and sealing against the second seat and about the foreign particle. This prevents liquid at the downstream side 40 of the stopper from being siphoned back to the liquid supply side at 41 and 41a.

Figure 3:
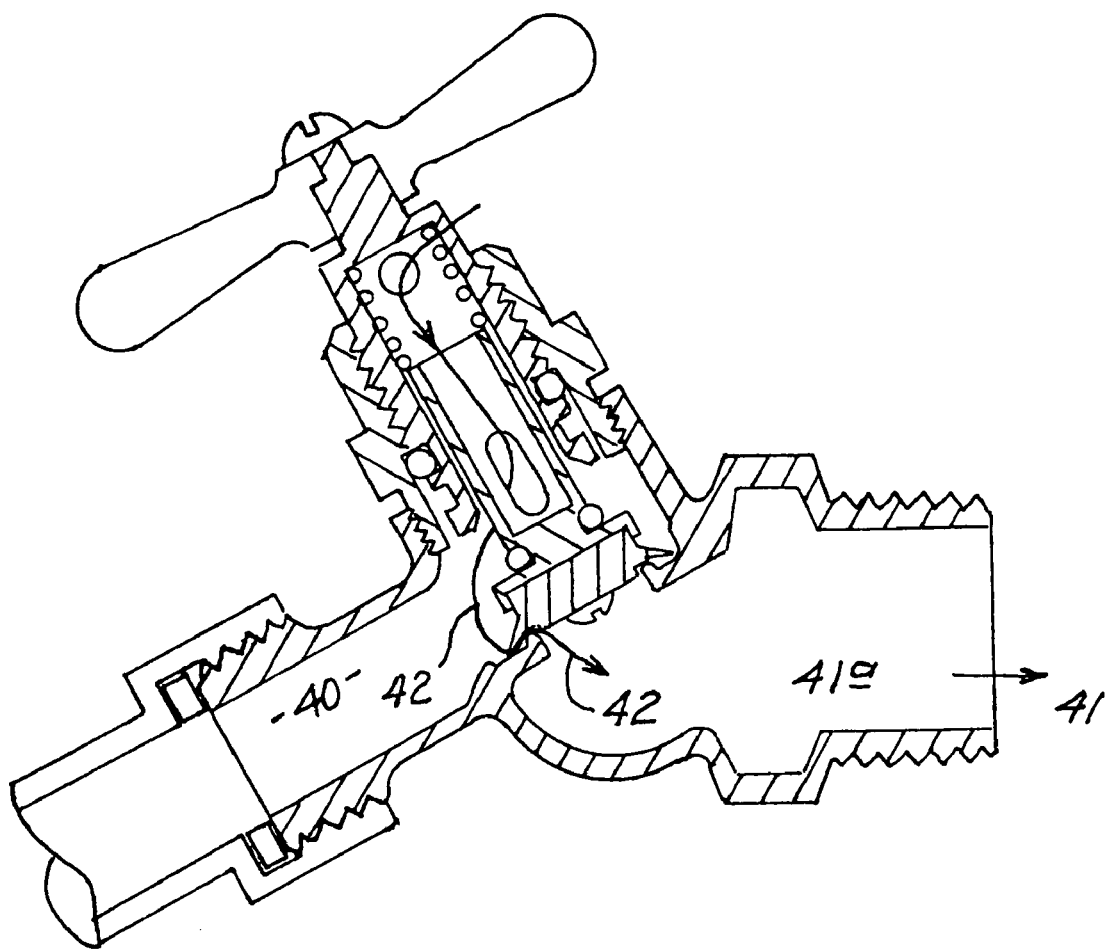
FIG. 3 is a view of the FIG. 2 valve, in a back siphonage condition, with exterior air flowing past the closed stopper via the lip engaging a fouling particle.

Under those conditions as seen in FIG. 3, air is admitted to the valve downstream side 40 and flows past the lip seal, to break the back siphoning effect. See air flow arrows 42, and no downstream liquid at 40, in FIG. 3, is siphoned back into the supply side 41 and 41a, even if the valve is fouled as by a foreign particle or particles, as referred to.

Figure 1:
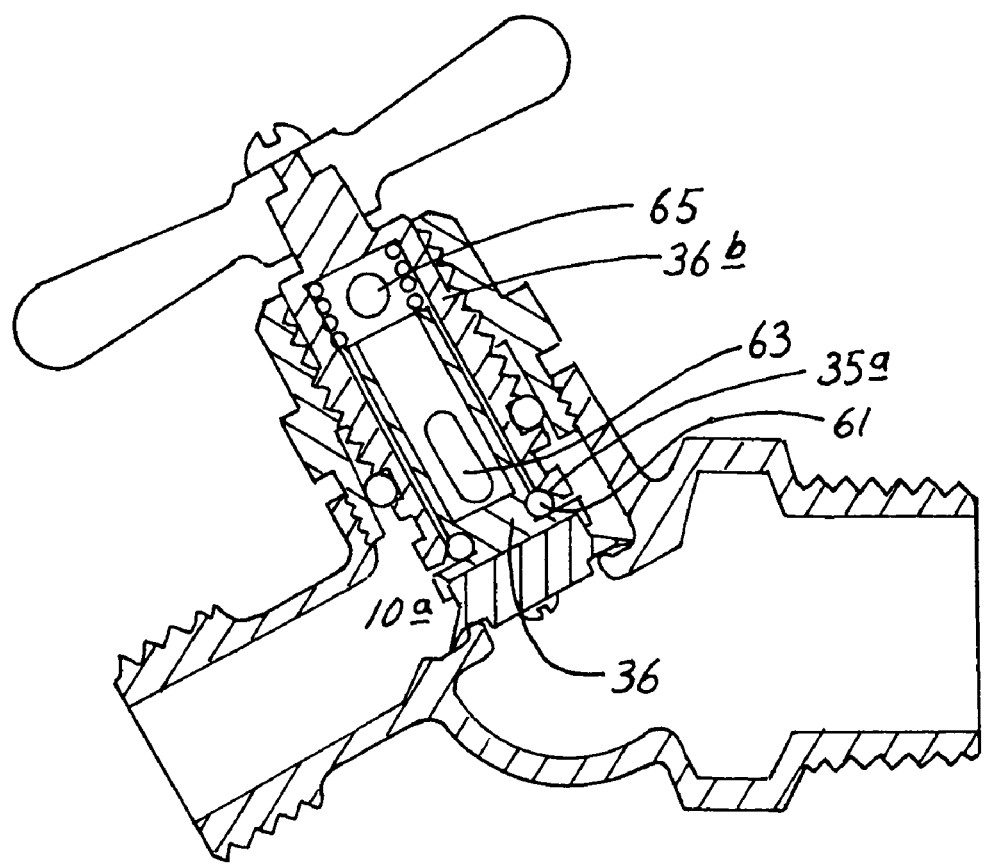
FIG. 1 is a view taken in section through a faucet valve in closed, i.e. OFF condition.
Figure 2:
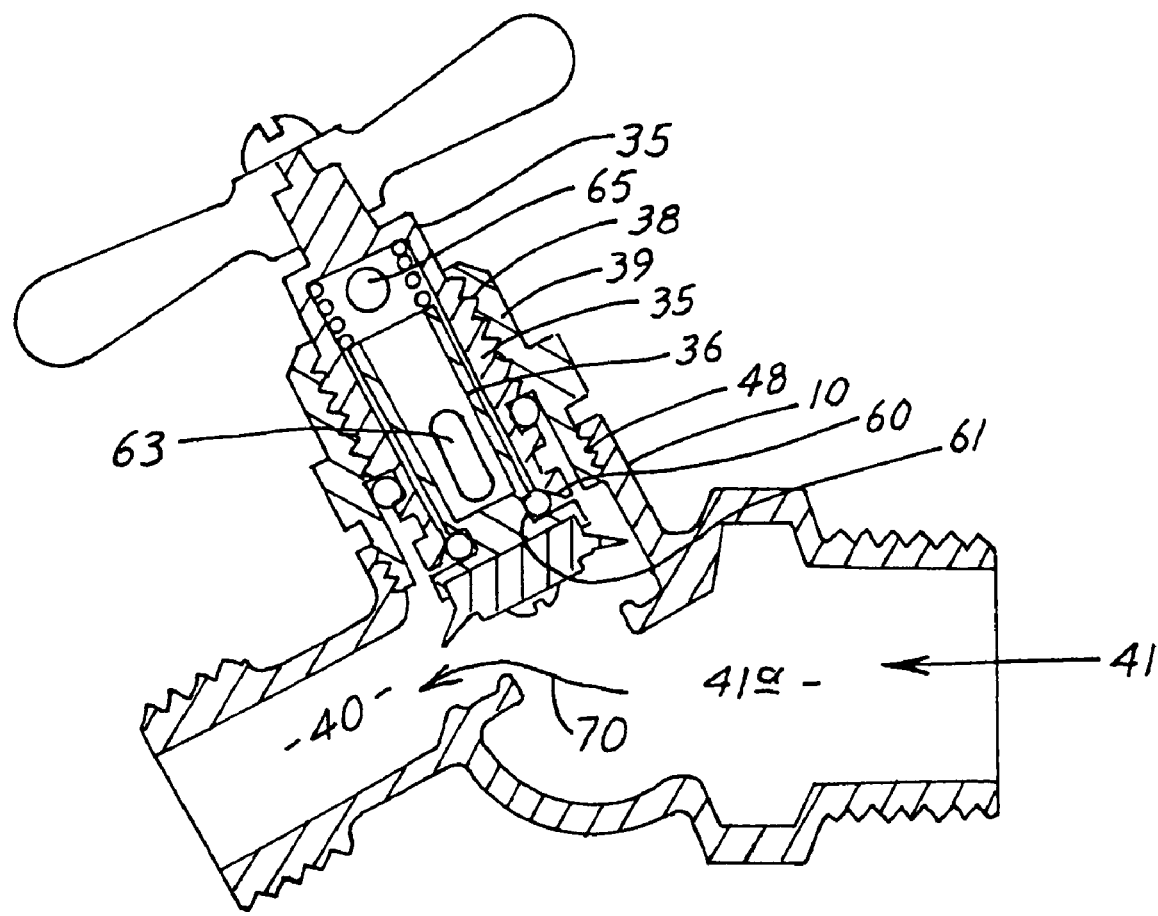
FIG. 2 is a view like FIG. 1, but showing the valve in open, i.e. ON condition.

Of particular advantage is the structure of the operative connection 17 between operator 14 (as for example a rotary handle 15), and the stopper 16, as shown in FIG. 5. That structure includes axially telescopically interfitting parts 35 and 36 which are relatively movable, axially, one part 35 connected to handle 15, and the other part 36 connected to the stopper. As shown, tubular part 35 is typically thread connected at 38 to the valve body 39 attached at 48 to the chamber 10 that contains the stopper. Accordingly, as the handle is rotated in one direction, part 35 advances from retracted position as seen in FIG. 2 (valve open position) toward the interior 10*a* of the chamber, as seen in FIG. 1, and relative to part 36, to close the stopper toward the seats as referred to. Therefore, FIG. 1 represents closed, i.e. OFF condition of the valve, as also seen in FIG. 5.

At that time, a bevel surface 35*a* on the lower end of a part 35 sealingly engages an O-ring seal 61 on part 36, near the stopper, to close off communication of fluid pressure in downstream chamber interior 10*a* to a side wall port 63 in tubular part or stem 36, and to a drain port 65 in the wall 36*b* of part 36.

However, in FIG. 2 ON configuration of the valve, the part 35 is fully retracted by the control handle, and the pressure of flowing supply liquid is exerted on the stopper to push it and part 36 bodily away from the seats, allowing flow through the valve as indicated by arrows 70 in FIG. 2. Supply liquid pressure exertion on the stopper, pushes the seal 61 against the bevel surface 60, blocking escape of liquid via ports 63 and 65.

Figure 4:
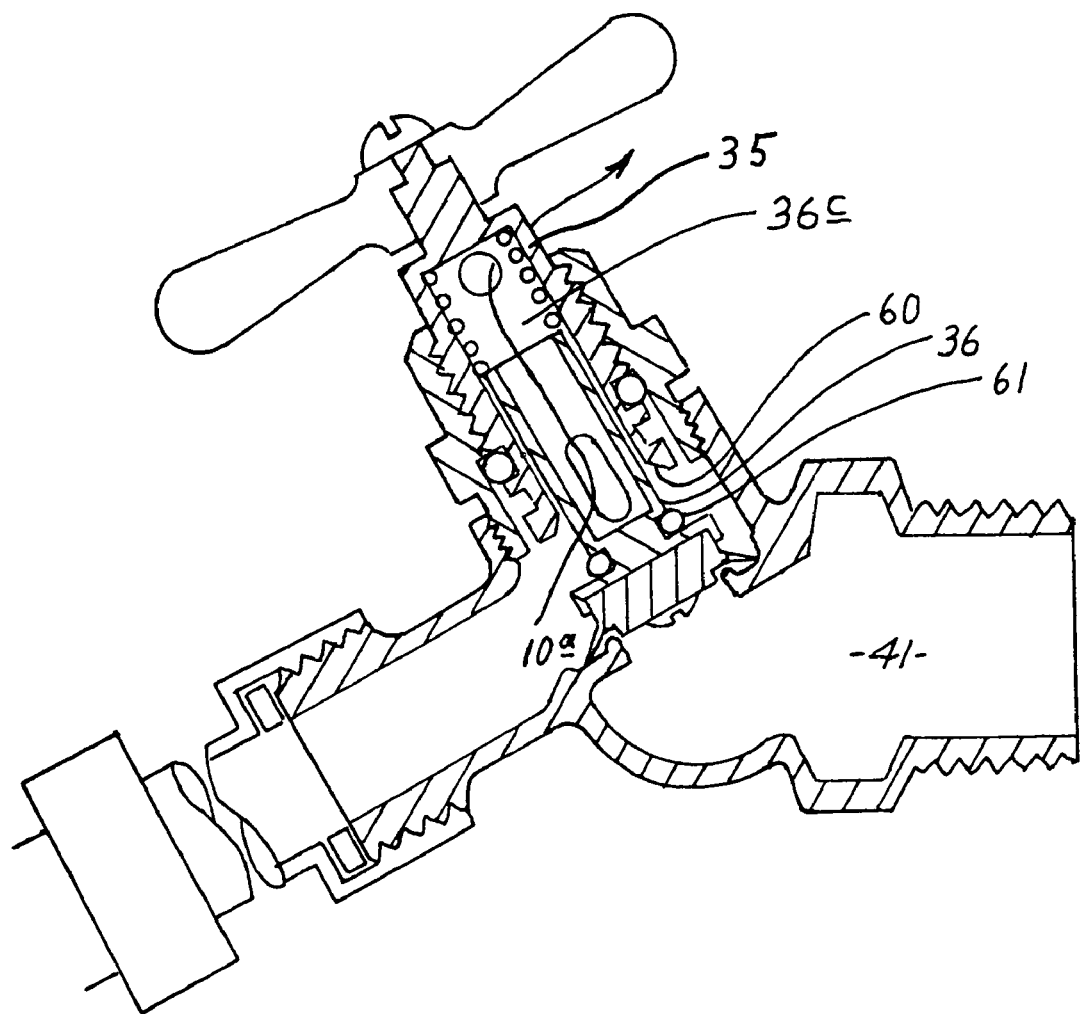
FIG. 4 is a view like FIG. 3, showing liquid flow through drain passages to the exterior, with the stopper in closed condition.

FIG. 4 shows the condition that suction exists at the supply side 41 of the stopper, back pressure at interior 10*a* then being relieved via ports 63 and 65, as shown. Drain port 65 is closed in FIG. 1, whereby loose material cannot become clogged, when the stopper seats on the first seat. Note that beveled surface 60 is retracted away from seal 61 on part 36. A compression spring 80 in the interior 36*c* of part 35 exerts axial pressure on part 36, tending to close the stopper against the seats.

Figure 7:
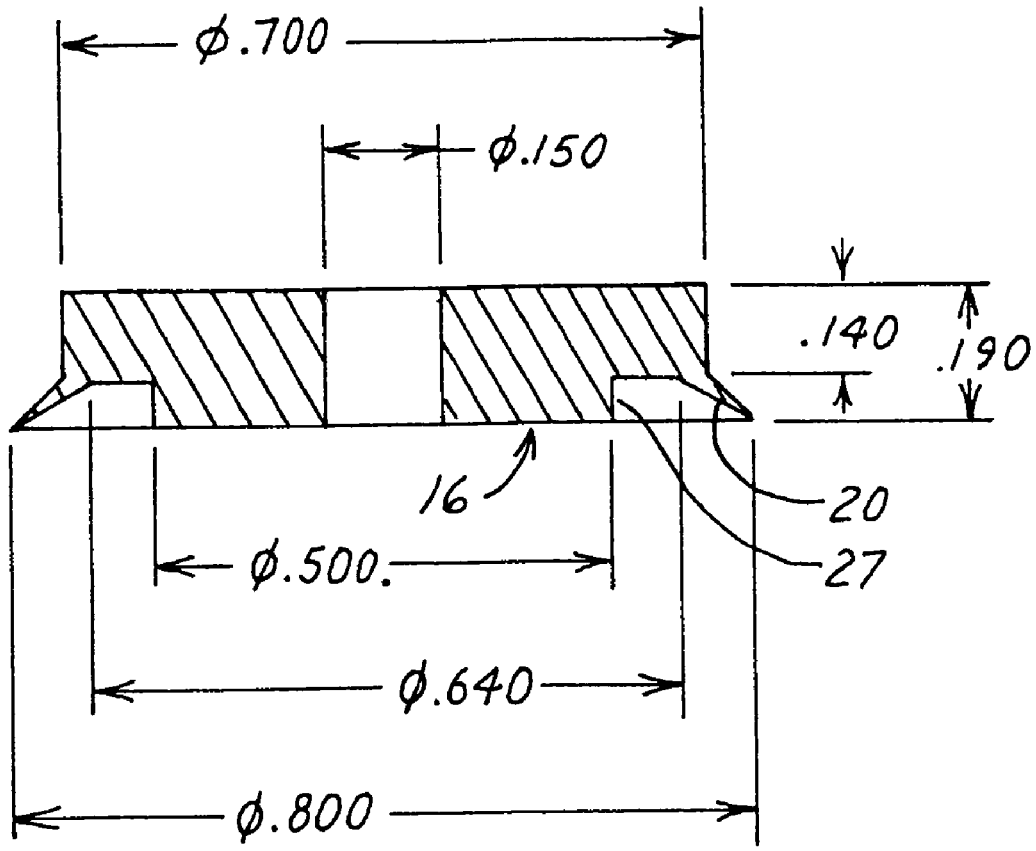
FIG. 7 is an axial section taken through a stopper, showing typical dimensions.

FIG. 7 shows the dimensions of a particularly advantageous unitary stopper and sealing lip 20 configuration.

I claim:

1. In a valve, the combination comprising
   a) a valve chamber, having a flow inlet and a flow outlet,
   b) a valve operator outside the chamber,
   c) a stopper in the chamber and operatively connected with the operator for movement toward and away from seat structure in the chamber, to move toward and control flow from the valve via said outlet,
   d) and said seat structure including first and second seats, said stopper located to seat on the first seat,
   e) there being a flexible sealing lip carried by the stopper and flexing in engagement with the second seat when the stopper seats on the first seat,
   f) the lip being annular and extending about a stopper annular surface that engages the first seat, the lip radially spaced outwardly and away from the first seat in lip flexed condition when the stopper seats on the first seat, the second seat being a flat planar surface facing in the same direction as the first seat projects, the lip projecting convergently toward the flat surface, the stopper and lip forming an annular recess to receive the first seat and a projection carrying the first seat spaced radially inwardly of the lip, there being a first gap between the lip and one side of the projection, and a second gap between the opposite side of the projection and structure associated with the stopper;
   g) the first seat extending annularly about a flow port directly between two chamber portions respectively extending to opposite sides of said flow port and respectively associated with said inlet and outlet, when the valve is open, said chamber portions and said port defining a flow path that extends substantially linearly and adjacent the stopper at a substantial angle or angles relative to an axial direction of stopper movement toward and away from said seat structure,
   h) and including telescopically interfitting parts, which are relatively movable, one part connected to the handle, and the other part carrying the stopper, said one part having threaded connection to the chamber, for advancing said one part toward the seat, in response to handle rotation, and wherein said one part defines a drain port to drain fluid from the interior of said one part wherein said other part projects, and said parts have a sealing position or position in which communication from the chamber interior to aid drain port is blocked, and said parts said part define interconnecting passages to supply exterior air to flow past the stopper via said lip, in closed position of the stopper, to break liquid back siphonage.

2. The combination of claim 1 wherein the lip tapers toward an annular edge that flexes when engaging the second seat.

3. The combination of claim 1 wherein the lip is configured with taper in an arcuately outwardly divergent direction to seal off against said second seat and also to asymmetrically flex and seal off against a foreign element lodged on the second seat.

4. The combination of claim 1 including a compression spring within the interior of said one part within which said other part projects, said spring acting to yieldably urge said other part toward the seat.

5. The combination of claim 4 wherein said spring is configured and located to cushion valve closing forces exerted on the stopper by said one part, and via the other part as the handle is rotated.

6. The combination of claim 1 wherein the lip has thickness t that decreases from a maximum value $t_1$ proximate said body and in a direction toward said edge, the lip having a length 1 in said direction, and wherein:

$1 > 2t_1$.

7. The combination of claim 1 wherein said drain port is closed when the stopper seats on the first seat.

8. The combination of claim 1 wherein the lip is configured with taper to seal off against said second seat and also to asymmetrically flex and seal off against a foreign element lodged on the second seat, the recess having trapezoidal cross sections.

9. The combination of claim 1 including venting structure associated with stem structure between said operator and said stopper for establishing venting of said chamber past said lip in valve open condition, said venting being blocked when the stopper seats on said first seat.

* * * * *